United States Patent
Ueno et al.

(10) Patent No.: US 6,918,701 B2
(45) Date of Patent: Jul. 19, 2005

(54) SYNTHETIC RESIN-MADE SLIDING BEARING

(75) Inventors: Atsushi Ueno, Fujisawa (JP); Kazuyuki Miyata, Fujisawa (JP)

(73) Assignee: Oiles Corporation, Tokyo (JP)

( * ) Notice: Subject to any disclaimer, the term of this patent is extended or adjusted under 35 U.S.C. 154(b) by 91 days.

(21) Appl. No.: 10/451,525

(22) PCT Filed: Feb. 25, 2002

(86) PCT No.: PCT/JP02/01671
§ 371 (c)(1), (2), (4) Date: Jun. 24, 2003

(87) PCT Pub. No.: WO02/068835
PCT Pub. Date: Sep. 6, 2002

(65) Prior Publication Data
US 2004/0028303 A1 Feb. 12, 2004

(30) Foreign Application Priority Data
Feb. 27, 2001 (JP) .................................. 2001-051630

(51) Int. Cl.$^7$ .............................................. F16C 17/04
(52) U.S. Cl. ..................... 384/420; 384/125; 384/144
(58) Field of Search ................. 384/144, 143, 384/275, 296, 297, 299, 300, 420, 428, 125; 267/220; 280/124.155

(56) References Cited

U.S. PATENT DOCUMENTS 4,854,745 A * 8/1989 Kamimura et al. .......... 384/420
4,969,752 A * 11/1990 Kubota et al. .............. 384/420
5,476,326 A   12/1995 Ueno et al.

FOREIGN PATENT DOCUMENTS

| JP | 7-32979 | 7/1995 |
|---|---|---|
| JP | 8-326758 A | 12/1996 |
| JP | 10-85809 A | 4/1998 |
| JP | 10-122233 A | 5/1998 |
| JP | 8-159160 A | 6/1998 |
| JP | 11-13768 A | 1/1999 |
| JP | 2001-27227 A | 1/2001 |

OTHER PUBLICATIONS

Specification and drawings annexed to the Request of Japanese Utility Model Application No. 68423/1993 (Laid–open No. 34220/1995). Oiles Corp.. Jun. 23, 1995. p. 11, line 15 to 27, Fig. 7.

* cited by examiner

Primary Examiner—Thomas R. Hannon
(74) Attorney, Agent, or Firm—Nixon & Vanderhye P.C.

(57) ABSTRACT

A synthetic resin-made sliding bearing (1) includes a synthetic resin-made lower casing (2), a synthetic resin-made upper casing (3) superposed on the lower casing (2), a synthetic resin-made disk-shaped thrust sliding bearing piece (4) disposed between the upper and the lower casings (3) and (2), and a synthetic resin-made cylindrical radial sliding bearing piece (5) disposed between the upper and the lower casings (3) and (2).

6 Claims, 3 Drawing Sheets

SYNTHETIC RESIN-MADE SLIDING BEARING

This application is the US national phase of international application PCT/JP02/01671 filed Feb. 25, 2002, which designated the US.

TECHNICAL FIELD

The present invention relates to a synthetic resin-made sliding bearing, and more particularly to a synthetic resin-made sliding bearing which is suitably incorporated in a strut-type suspension (Macpherson type) in a four-wheeled vehicle.

BACKGROUND ART

A strut-type suspension used in a front wheel of a four-wheeled vehicle generally has a structure in which a strut assembly incorporating a hydraulic shock absorber in an outer cylinder formed integrally with a main shaft is combined with a coil spring. In such suspensions, there is a type in which a piston rod of the strut assembly rotates and a type in which the piston rod does not rotate when the strut assembly rotates together with the coil spring on steering operation. In either type, there are cases where a synthetic resin-made sliding bearing in place of a rolling ball bearing is used between a mounting member of a vehicle body and an upper spring seat of the coil spring so as to smoothly allow the rotation of the strut assembly.

The synthetic resin-made sliding bearing generally has a synthetic resin-made lower casing and a synthetic resin-made upper casing superposed on the lower casing, and a sliding bearing piece or a sliding bearing projection is disposed in a space between the lower casing and the upper casing. However, if dust, muddy water, or the like enters this space, there is a possibility that a desired bearing function cannot be obtained. Meanwhile, since the strut-type suspension is fitted at a position where dust, rainwater, muddy water, or the like is directly applied during the traveling of the vehicle, the working environment of the sliding bearing fitted between the mounting member of the vehicle body and the upper spring seat of the coil spring becomes extremely severe. Accordingly, if the outer peripheral side and the inner peripheral side of the space where the sliding bearing piece or the sliding bearing projection is disposed is directly open to the outside, the risk of the entry of dust, rainwater, muddy water, or the like from this opening into the space becomes very high, so that the sealing performance at this portion becomes extremely important. In particular, the aforementioned risk becomes increasingly high with the synthetic resin-made sliding bearing in which the lower casing and the upper casing are formed with the inner peripheral side of the space open downward so as to prevent the stagnation of water in the space.

The present invention has been devised in view of the above-described aspects, and its object is to provide a synthetic resin-made sliding bearing which prevents the entry of dust, rainwater, muddy water, and the like onto sliding surfaces from the outer peripheral side and the inner peripheral side of the space where the sliding bearing piece is disposed, so as to eliminate a decline of sliding characteristics attributable to the entry of the dust, rainwater, muddy water, and the like, thereby making it possible to maintain smooth steering force at the time of the steering operation for extended periods of time.

DISCLOSURE OF INVENTION

A synthetic resin-made sliding bearing in accordance with a first aspect of the invention comprises a synthetic resin-made lower casing, a synthetic resin-made upper casing superposed on the lower casing, a synthetic resin-made disk-shaped thrust sliding bearing piece disposed between the upper casing and the lower casing, and a synthetic resin-made cylindrical radial sliding bearing piece disposed between the upper casing and the lower casing, the lower casing including a tubular portion having an inner peripheral surface, a first annular plate portion formed integrally with an end portion of the tubular portion, a first annular projection formed integrally with an upper surface of the first annular plate portion, an annular engaging projection formed integrally with an outer edge of the first annular plate portion, a second annular plate portion formed integrally with another end portion of the tubular portion, and a second annular projection formed integrally with an upper surface of the second annular plate portion, the upper casing including a hollow cylindrical portion disposed inside the tubular portion of the lower casing and having an inner peripheral surface and an outer peripheral surface which are concentric with the inner peripheral surface of the tubular portion of the lower casing, a third annular plate portion formed integrally with an end portion of the hollow cylindrical portion, a first annular suspended portion formed integrally with a lower surface of the third annular plate portion, an annular engaging suspended portion formed integrally with an outer edge of the third annular plate portion, and a pair of concentric second annular suspended portions formed integrally with another end portion of the hollow cylindrical portion, the first annular suspended portion being disposed in a first annular groove defined by the first annular projection and the annular engaging projection, the annular engaging projection being disposed in a second annular groove defined by the first annular suspended portion and the annular engaging suspended portion, the second annular projection being disposed in a third annular groove defined by the pair of second annular suspended portions, the thrust sliding bearing piece being disposed between the upper surface of the first annular plate portion and the lower surface of the third annular plate portion on an inner peripheral side of the first annular projection in such a manner as to be slidably brought into contact with the upper surface and the lower surface, and the radial sliding bearing piece being disposed between the inner peripheral surface of the tubular portion and the outer peripheral surface of the hollow cylindrical portion in such a manner as to be slidably brought into contact with the inner peripheral surface of the tubular portion and the outer peripheral surface of the hollow cylindrical portion.

According to the sliding bearing in accordance with the first aspect, since the second annular projection is disposed in the third annular groove defined by the pair of second annular suspended portions, it is possible to prevent the entry of dust, rainwater, muddy water, and the like onto the sliding surfaces of the radial sliding bearing piece from the inner peripheral side. Hence, it is possible to eliminate a decline of sliding characteristics attributable to the entry of the dust, rainwater, muddy water, and the like, thereby making it possible to maintain smooth steering force at the time of the steering operation for extended periods of time.

With the synthetic resin-made sliding bearing in accordance with a second aspect of the invention, in the sliding bearing according to the first aspect, the first annular projection is formed integrally with the upper surface of the first annular plate portion such that a top surface thereof is higher than a top surface of the annular engaging projection.

According to the sliding bearing in accordance with the second aspect, since the top surface of the first annular projection is higher than the top surface of the annular engaging projection, even if rainwater, muddy water, or the like has ridden over the annular engaging projection, the entry of such rainwater, muddy water, or the like onto the sliding surfaces of the thrust sliding bearing piece can be prevented by the first annular projection. This makes it possible to eliminate the decline of sliding characteristics attributable to the entry of the rainwater, muddy water, and the like, thereby making it possible to maintain smooth steering force at the time of the steering operation for extended periods of time.

With the synthetic resin-made sliding bearing in accordance with a third aspect of the invention, in the sliding bearing according to the first or second aspect, at least one of the inner peripheral surface of the tubular portion and the outer peripheral surface of the hollow cylindrical portion is formed with an annular stepped portion defining an annular step surface opposing an annular lower surface of the radial sliding bearing piece.

According to the sliding bearing in accordance with the third aspect, since the lowering of the radial sliding bearing piece can be prevented by the annular step surface, the radial sliding bearing piece between the inner peripheral surface of the tubular portion and the outer peripheral surface of the hollow cylindrical portion can be held at a desired position.

With the synthetic resin-made sliding bearing in accordance with a fourth aspect of the invention, in the sliding bearing according to the third aspect, the second annular projection is formed integrally with the upper surface of the second annular plate portion such that a top surface thereof is lower than the annular step surface.

According to the sliding bearing in accordance with the fourth aspect, since the top surface of the second annular projection is lower than the annular step surface, even if rainwater, muddy water, or the like has ridden over the second annular projection and entered between the inner peripheral surface of the tubular portion and the outer peripheral surface of the hollow cylindrical portion, the level of such rainwater, muddy water, or the like does not reach the annular step surface. Hence, it is possible to prevent the entry of such rainwater, muddy water, or the like onto the sliding surfaces of the thrust sliding bearing piece. This also makes it possible to eliminate the decline of sliding characteristics attributable to the entry of the rainwater, muddy water, and the like, thereby making it possible to maintain smooth steering force at the time of the steering operation for extended periods of time.

With the synthetic resin-made sliding bearing in accordance with a fifth aspect of the invention, in the sliding bearing according to any one of the first to fourth aspects, the lower casing further includes a third annular projection formed integrally with the upper surface of the first annular plate portion, and the thrust sliding bearing piece is disposed on an outer peripheral side of the third annular projection.

According to the sliding bearing in accordance with the fifth aspect, since the radial movement of the thrust sliding bearing piece can be prevented by the third annular projection, the thrust sliding bearing piece between the upper surface of the first annular plate portion and the lower surface of the third annular plate portion can be held at a desired position.

With the synthetic resin-made sliding bearing in accordance with a sixth aspect of the invention, in the sliding bearing according to any one of the first to fifth aspects, at least one of the inner peripheral surface of the tubular portion and the outer peripheral surface of the hollow cylindrical portion is formed with another annular stepped portion defining another annular step surface opposing the annular upper surface of the radial sliding bearing piece.

According to the sliding bearing in accordance with the sixth aspect, since the rise of the radial sliding bearing piece can be prevented by the other annular step surface, the radial sliding bearing piece between the inner peripheral surface of the tubular portion and the outer peripheral surface of the hollow cylindrical portion can be held at a desired position.

The synthetic resin for forming the upper and lower casings in the invention should preferably excel in sliding characteristics and mechanical characteristics including the wear resistance, shock resistance, and creep resistance. In addition, the synthetic resin for forming the thrust sliding bearing piece and the radial sliding bearing piece which are accommodated between the upper and lower casings should preferably have self-lubricity, in particular. For example, a polyacetal resin, a polyamide resin, a polyester resin such as polybutylene terephthalate (PBT), and a polyolefin resin such as polyethylene and polypropylene are suitably used. In addition, a polycarbonate resin or the like may be used.

As material of the upper and lower casings, it is possible to use a synthetic resin similar to the synthetic resin for forming the thrust sliding bearing piece and the radial sliding bearing piece. In particular, however, a synthetic resin which gives a combination excelling in the frictional characteristics with the synthetic resin used for the thrust sliding bearing piece and the radial sliding bearing piece and which has relatively high rigidity is desirable. To cite desirable combinations by way of example, as material of the thrust sliding bearing piece and the radial sliding bearing piece, on the one hand, and the upper and lower casings, on the other hand, it is possible to cite the combination of polyacetal and polyimide, the combination of polyethylene and polyacetal, the combination of polyacetal and PBT, and the combination of polyacetal and polyacetal.

In accordance with the invention, it is possible to provide a synthetic resin-made sliding bearing which prevents the entry of dust, rainwater, muddy water, and the like onto sliding surfaces from the outer peripheral side and the inner peripheral side of the space where the sliding bearing piece is disposed, so as to eliminate a decline of sliding characteristics attributable to the entry of the dust, rainwater, muddy water, and the like, thereby making it possible to maintain smooth steering force at the time of the steering operation for extended periods of time.

Hereafter, a detailed description will be given of the present invention with reference to the embodiments shown in the drawings. It should be noted that the present invention is not limited to these embodiments.

EMBODIMENTS

Figure 1:
FIG. 1 is a cross-sectional view of a preferred embodiment of the invention.
Figure 2:
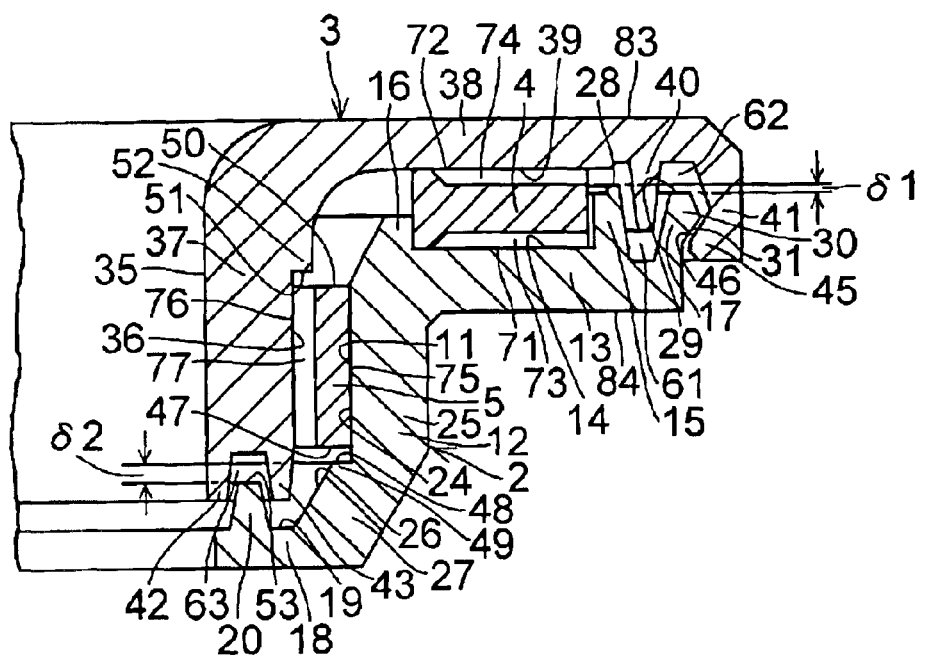
FIG. 2 is a partial enlarged cross-sectional view of the embodiment shown in FIG. 1.
Figure 3:
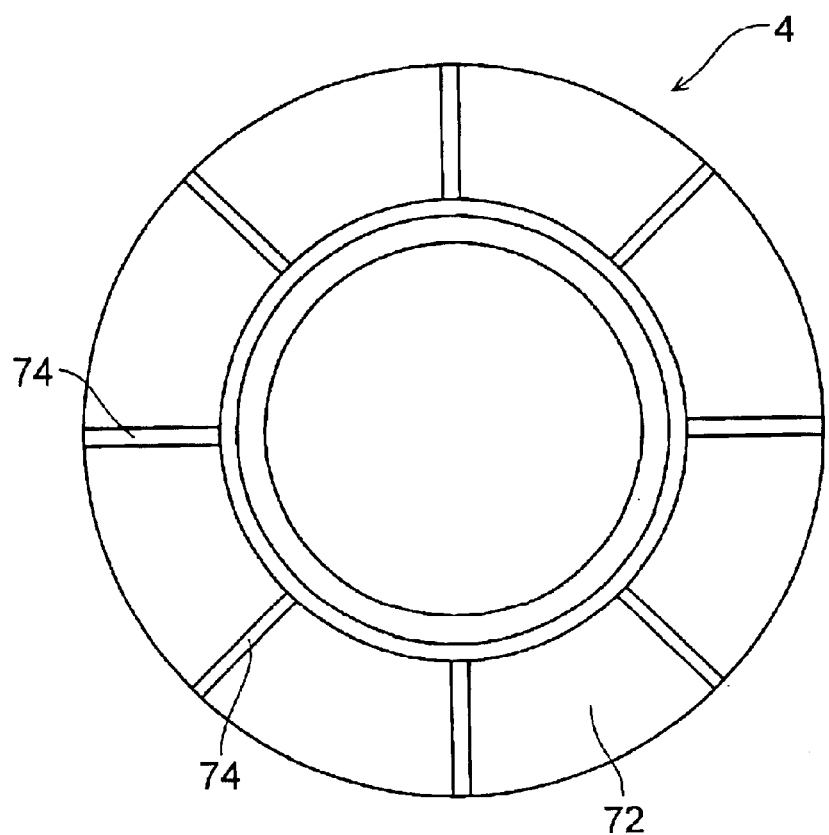
FIG. 3 is a plan view of a thrust sliding bearing piece of the embodiment shown in FIG. 1.
Figure 4:
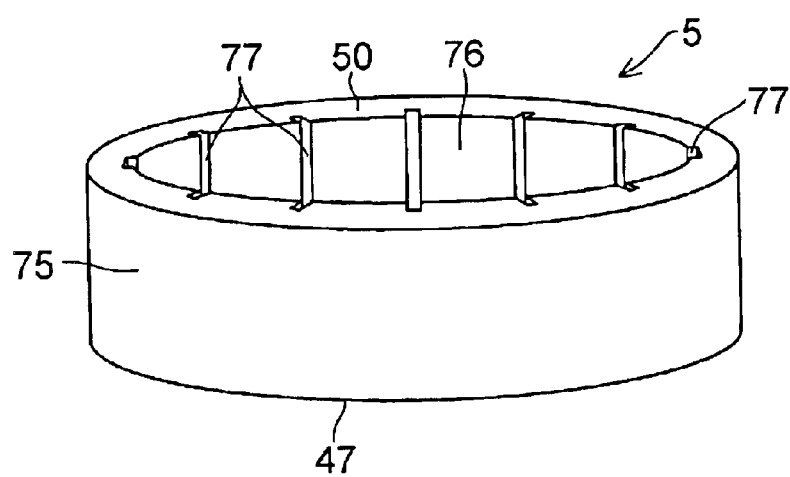
FIG. 4 is a perspective view of a radial sliding bearing piece of the embodiment shown in FIG. 1.

In FIGS. 1 to 4, a synthetic resin-made sliding bearing 1 in accordance with this embodiment is comprised of a synthetic resin-made lower casing 2, a synthetic resin-made upper casing 3 superposed on the lower casing 2, a synthetic resin-made disk-shaped thrust sliding bearing piece 4 disposed between the upper and lower casings 3 and 2, and a synthetic resin-made cylindrical radial sliding bearing piece 5 disposed between the upper and lower casings 3 and 2.

The lower casing 2 includes a tubular portion 12 having an inner peripheral surface 11, an annular plate portion 13 formed integrally with an end portion of the tubular portion 12, an annular projection 15 formed integrally with an outer side of an upper surface 14 of the annular plate portion 13, an annular projection 16 formed integrally with an inner side of the upper surface 14 of the annular plate portion 13, an annular engaging projection 17 formed integrally with an outer edge of the annular plate portion 13, an annular plate portion 18 formed integrally with the other end portion of the tubular portion 12, and an annular projection 20 formed integrally with an upper surface 19 of the annular plate portion 18.

The tubular portion 12 consists of an hollow cylindrical portion 25 having a cylindrical inner peripheral surface 24 which is a portion of the inner peripheral surface 11, as well as a conical tubular portion 27 formed integrally with the hollow cylindrical portion 25 and having a conical inner peripheral surface 26 which is another portion of the inner peripheral surface 11. The annular projection 15 is formed integrally with the upper surface 14 of the annular plate portion 13 such that its top surface 28 is δ1 higher than a top surface 29 of the annular engaging projection 17. The annular engaging projection 17 has in its substantially central portion an annular enlarged portion 30 extending outwardly and has on an outer surface of the enlarged portion 30 an annular inclined engaging surface 31.

The upper casing 3 includes a hollow cylindrical portion 37 disposed inside the tubular portion 12 and having an inner peripheral surface 35 and an outer peripheral surface 36 which are concentric with the inner peripheral surface 24 of the hollow cylindrical portion 25; an annular plate portion 38 formed integrally with an end portion of the hollow cylindrical portion 37; an annular suspended portion 40 formed integrally with an outer side of a lower surface 39 of the annular plate portion 38; an annular engaging suspended portion 41 formed integrally with an outer edge of the annular plate portion 38; and a pair of concentric annular suspended portions 42 and 43 formed integrally with the other end portion of the hollow cylindrical portion 37.

The annular engaging suspended portion 41 has in its lower portion an enlarged portion 45 extending inwardly and has on an inner surface of the enlarged portion 45 an annular inclined engaging surface 46, and the inclined engaging surface 46 is opposed to the inclined engaging surface 31. An annular stepped portion 49 defining an annular step surface 48 opposing an annular lower surface 47 of the radial sliding bearing piece 5 is formed on at least one of the inner peripheral surface 11 of the tubular portion 12 and the outer peripheral surface 36 of the hollow cylindrical portion 37, i.e., on the inner peripheral surface 11 of the tubular portion 12 in this embodiment. The inner peripheral surface 24 and the inner peripheral surface 26 are connected to each other via the annular step surface 48. An annular stepped portion 52 defining an annular step surface 51 opposing an annular upper surface 50 of the radial sliding bearing piece 5 is formed on at least one of the inner peripheral surface 11 of the tubular portion 12 and the outer peripheral surface 36 of the hollow cylindrical portion 37, i.e., on the outer peripheral surface 36 of the hollow cylindrical portion 37 in this embodiment. The annular projection 20 is formed integrally with the upper surface 19 of the annular plate portion 18 such that its top surface 53 is δ2 lower than the annular step surface 48.

The annular suspended portion 40 is disposed in an annular groove 61 defined by the annular projection 15 and the annular engaging projection 17, the annular engaging projection 17 is disposed in an annular groove 62 defined by the annular suspended portion 40 and the annular engaging suspended portion 41, and the annular projection 20 is disposed in an annular groove 63 defined by the pair of annular suspended portions 42 and 43.

The thrust sliding bearing piece 4 is disposed between the upper surface 14 of the annular plate portion 13 and the lower surface 39 of the annular plate portion 38 on the inner peripheral side of the annular projection 15 and the outer peripheral side of the annular projection 16 in such a manner as to be slidably brought into contact with the upper surface 14 and the lower surface 39. In the thrust sliding bearing piece 4 having an annular lower surface 71 and an annular upper surface 72 which are slidably brought into contact with the upper surface 14 and the lower surface 39, respectively, a plurality of grooves 73 and 74 extending in the radial direction for storing grease (a lubricating oil) are formed at equal intervals in the circumferential direction in the lower surface 71 and the upper surface 72, respectively.

The radial sliding bearing piece 5 is disposed between the inner peripheral surface 24 of the hollow cylindrical portion 25 and the outer peripheral surface 36 of the hollow cylindrical portion 37 in such a manner as to be slidably brought into contact with the inner peripheral surface 24 and the outer peripheral surface 36. In the radial sliding bearing piece 5 having an outer peripheral surface 75 and an inner peripheral surface 76 which are slidably brought into contact with the inner peripheral surface 24 and the outer peripheral surface 36, respectively, a plurality of grooves 77 extending in the axial direction for storing grease (lubricating oil) are formed at equal intervals in the circumferential direction in the inner peripheral surface 76.

Figure 5:
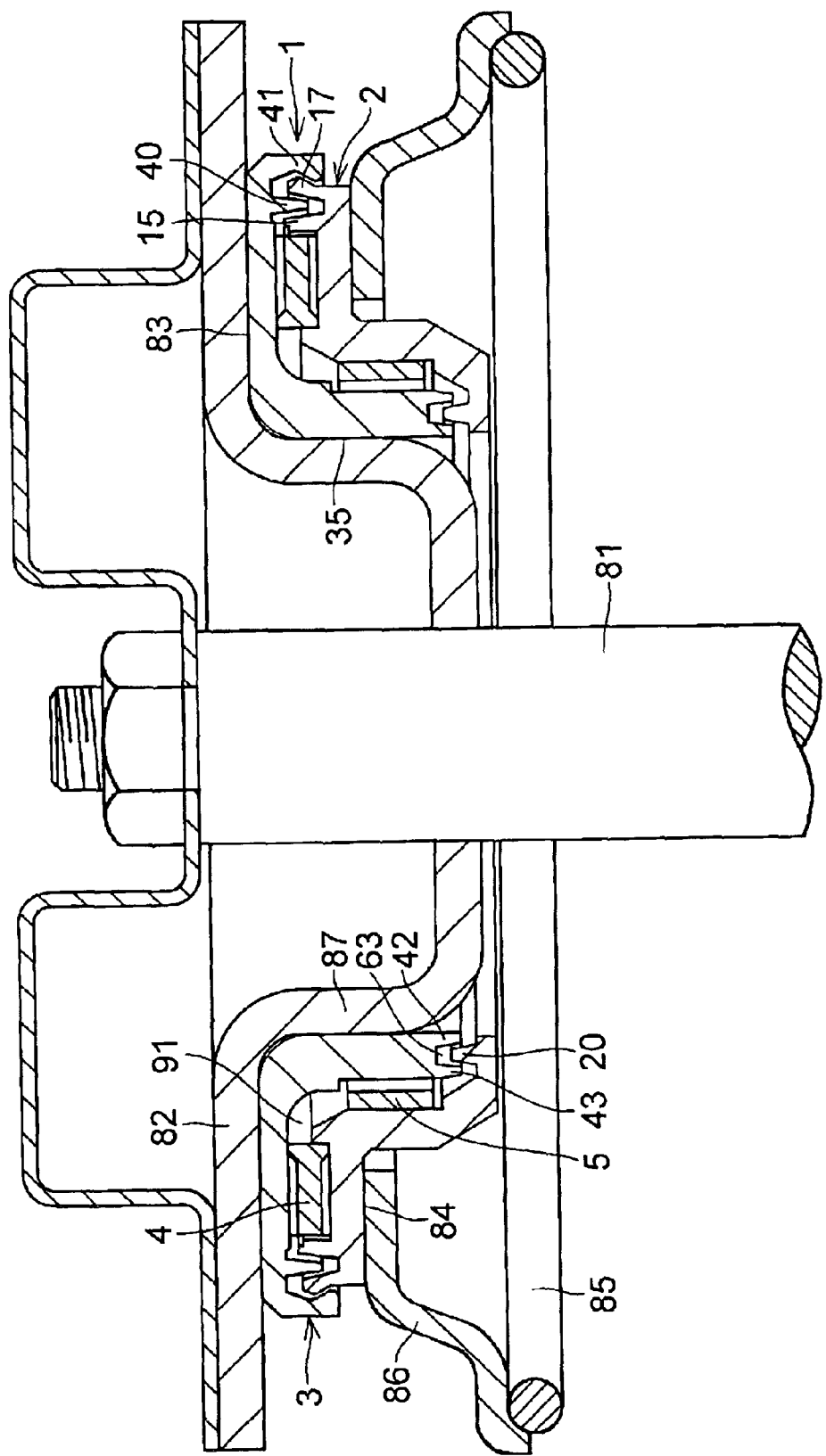
FIG. 5 is an explanatory cross-sectional view of an example in which the embodiment shown in FIG. 1 is used in a strut assembly.

As shown in FIG. 5, in a state in which, after a piston rod 81 of a shock absorber in a strut assembly is passed through an insertion hole defined by the inner peripheral surface 35 of the sliding bearing 1, an annular upper surface 83 of the upper casing 3 is made to closely abut against a mounting member 82 on a vehicle side where one end of the piston rod 81 is attached, while an annular lower surface 84 of the lower casing 2 is made to closely abut against an upper spring seat 86 for a coil spring 85 in the strut assembly, the above-described synthetic resin-made sliding bearing 1 is fitted between the upper spring seat 86 and the mounting member 82 so as to be used. At this time, the inner peripheral surface 35 is made to closely abut against the outer peripheral surface of a hollow cylindrical portion 87 of the mounting member 82.

When the strut assembly is rotated by the steering operation, the lower casing 2 is rotated with respect to the upper casing 3, this rotation of the lower casing 2 is made smooth by the thrust sliding bearing 4 and the radial sliding bearing 5 which are disposed between the upper and lower casings 3 and 2. Accordingly, the steering operation is also effected without resistance. In addition, the entry of dust and the like into a space 91 between the upper and lower casings 3 and 2 is prevented on the inner peripheral side by a labyrinth formed by the annular projection 20 and the annular suspended portions 42 and 43 and on the outer peripheral side by a labyrinth formed by the annular projection 15 and the annular engaging projection 17 as well as the annular suspended portion 40 and the annular engaging suspended portion 41. Thus it is possible to reliably prevent the entry of dust and the like onto the respective sliding surfaces of the thrust sliding bearing piece 4 and the radial sliding bearing piece 5 which are disposed between these two labyrinths.

According to the sliding bearing 1, since the annular projection 20 is disposed in the groove 63 defined by the pair of annular suspended portions 42 and 43, it is possible to prevent the entry of dust, rainwater, muddy water, and the like onto the outer and inner peripheral surfaces 75 and 76, which are the sliding surfaces of the radial sliding bearing piece 5, from the inner peripheral side. Hence, it is possible to eliminate a decline of sliding characteristics attributable to the entry of the dust, rainwater, muddy water, and the like, thereby making it possible to maintain smooth steering force at the time of the steering operation for extended periods of time.

In addition, according to the sliding bearing 1, since the top surface 28 of the annular projection 15 is $\delta 1$ higher than the top surface 29 of the annular engaging projection 17, even if rainwater, muddy water, or the like has ridden over the annular engaging projection 17, the entry of such rainwater, muddy water, or the like onto the lower surface 71 and the upper surface 72, which are the sliding surfaces of the thrust sliding bearing piece 4, can be prevented by the annular projection 15. This makes it possible to eliminate the decline of sliding characteristics attributable to the entry of the rainwater, muddy water, and the like, thereby making it possible to maintain smooth steering force at the time of the steering operation for extended periods of time. Additionally, the lowering of the radial sliding bearing piece 5 can be prevented by the annular step surface 48, so that the radial sliding bearing piece 5 between the inner peripheral surface 11 of the tubular portion 12 and the outer peripheral surface 36 of the hollow cylindrical portion 37 can be held at a desired position. Since the top surface 53 of the annular projection 20 is $\delta 2$ lower than the annular step surface 48, even if rainwater, muddy water, or the like has ridden over the annular projection 20, the level of such rainwater, muddy water, or the like does not reach the annular step surface 48. Hence, it is possible to prevent the entry of such rainwater, muddy water, or the like onto the sliding surfaces of the radial sliding bearing piece 5. This also makes it possible to eliminate the decline of sliding characteristics attributable to the entry of the rainwater, muddy water, and the like, thereby making it possible to maintain smooth steering force at the time of the steering operation for extended periods of time. Furthermore, the radial movement of the thrust sliding bearing piece 4 can be prevented by the annular projection 16, so that the thrust sliding bearing piece 4 between the upper surface 14 of the annular plate portion 13 and the lower surface 39 of the annular plate portion 38 can be held at a desired position. In addition, the rise of the radial sliding bearing piece 5 can be prevented by the annular step surface 51, so that the radial sliding bearing piece 5 between the inner peripheral surface 11 of the tubular portion 12 and the outer peripheral surface 36 of the hollow cylindrical portion 37 can be held at a desired position.

It should be noted that the inclined engaging surface 31 and the inclined engaging surface 46 opposing each other may be resiliently brought into contact with each other by the resiliency of the annular engaging projection 17 and the annular engaging suspended portion 41, and a resiliently sealing means may be formed in addition to the sealing means using the labyrinth. Still alternatively, the inclined engaging surface 31 and the inclined engaging surface 46 may be opposed to each other with a very small gap therebetween. In addition, although the groove 77 is provided in the inner peripheral surface 76, the groove 77 may be provided in the outer peripheral surface 75 in conjunction with it or in place of it.

What is claimed is:

1. A synthetic resin-made sliding bearing, comprising:

a synthetic resin-made lower casing, a synthetic resin-made upper casing superposed on said lower casing, a synthetic resin-made disk-shaped thrust sliding bearing piece disposed between said upper casing and said lower casing, and a synthetic resin-made cylindrical radial sliding bearing piece disposed between said upper casing and said lower casing, said lower casing including a tubular portion having an inner peripheral surface, a first annular plate portion formed integrally with an end portion of said tubular portion, a first annular projection formed integrally with an upper surface of said first annular plate portion, an annular engaging projection formed integrally with an outer edge of said first annular plate portion, a second annular plate portion formed integrally with another end portion of said tubular portion, and a second annular projection formed integrally with an upper surface of said second annular plate portion, said upper casing including a hollow cylindrical portion disposed inside said tubular portion of said lower casing and having an inner peripheral surface and an outer peripheral surface which are concentric with the inner peripheral surface of said tubular portion of said lower casing, a third annular plate portion formed integrally with an end portion of said hollow cylindrical portion, a first annular suspended portion formed integrally with a lower surface of said third annular plate portion, an annular engaging suspended portion formed integrally with an outer edge of said third annular plate portion, and a pair of concentric second annular suspended portions formed integrally with another end portion of said hollow cylindrical portion, said first annular suspended portion being disposed in a first annular groove defined by said first annular projection and said annular engaging projection, said annular engaging projection being disposed in a second annular groove defined by said first annular suspended portion and said annular engaging suspended portion, said second annular projection being disposed in a third annular groove defined by said pair of second annular suspended portions, said thrust sliding bearing piece being disposed between the upper surface of said first annular plate portion and the lower surface of said third annular plate portion on an inner peripheral side of said first annular projection in such a manner as to be slidably brought into contact with the upper surface and the lower surface, and said radial sliding bearing piece being disposed between the inner peripheral surface of said tubular portion and the outer peripheral surface of said hollow cylindrical portion in such a manner as to be slidably brought into contact with the inner peripheral surface of said tubular portion and the outer peripheral surface of said hollow cylindrical portion.

2. The synthetic resin-made sliding bearing according to claim 1, wherein said first annular projection is formed integrally with the upper surface of said first annular plate portion such that a top surface thereof is higher than a top surface of said annular engaging projection.

3. The synthetic resin-made sliding bearing according to claim 1, wherein at least one of the inner peripheral surface of said tubular portion and the outer peripheral surface of said hollow cylindrical portion is formed with an annular stepped portion defining an annular step surface opposing an annular lower surface of said radial sliding bearing piece.

4. The synthetic resin-made sliding bearing according to claim 3, wherein said second annular projection is formed integrally with the upper surface of said second annular plate portion such that a top surface thereof is lower than the annular step surface.

5. The synthetic resin-made sliding bearing according to claim 3, wherein at least one of the inner peripheral surface of said tubular portion and the outer peripheral surface of said hollow cylindrical portion is formed with another annular stepped portion defining another annular step surface opposing the annular upper surface of said radial sliding bearing piece.

6. The synthetic resin-made sliding bearing according to claim 1, wherein said lower casing further includes a third annular projection formed integrally with the upper surface of said first annular plate portion, and said thrust sliding bearing piece is disposed on an outer peripheral side of said third annular projection.

* * * * *